(12) United States Patent
Cheng et al.

(10) Patent No.: US 7,369,750 B2
(45) Date of Patent: May 6, 2008

(54) MANAGING RECORD EVENTS

(75) Inventors: David J. Cheng, Cupertino, CA (US); Mark G. Young, Cupertino, CA (US); Samuel Thomas Scott, III, Los Gatos, CA (US); Pradhan S. Rao, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 1476 days.

(21) Appl. No.: 10/131,661

(22) Filed: Apr. 24, 2002

(65) Prior Publication Data

US 2003/0204848 A1    Oct. 30, 2003

(51) Int. Cl.
*H04N 5/91*    (2006.01)
*G06F 13/00*    (2006.01)

(52) U.S. Cl. .............. 386/83; 725/58; 725/80
(58) Field of Classification Search ........... 725/44, 725/57, 58, 80; 386/83; 715/731–734; 700/19
See application file for complete search history.

(56) References Cited

U.S. PATENT DOCUMENTS

| | | | | |
|---|---|---|---|---|
| 5,307,173 A | * | 4/1994 | Yuen et al. | .......... 386/83 |
| 6,449,514 B1 | * | 9/2002 | Natsubori et al. | .......... 700/19 |
| 6,601,237 B1 | * | 7/2003 | Ten Kate et al. | .......... 725/47 |
| 2002/0035727 A1 | * | 3/2002 | Numata et al. | .......... 725/44 |
| 2003/0154484 A1 | * | 8/2003 | Plourde et al. | .......... 725/58 |
| 2003/0198462 A1 | * | 10/2003 | Bumgardner et al. | .......... 386/83 |
| 2005/0204388 A1 | * | 9/2005 | Knudson et al. | .......... 725/58 |
| 2006/0140584 A1 | * | 6/2006 | Ellis et al. | .......... 386/83 |

FOREIGN PATENT DOCUMENTS

WO    WO 92/22983    * 12/1992

* cited by examiner

*Primary Examiner*—Thai Q. Tran
*Assistant Examiner*—Mishawn Dunn
(74) *Attorney, Agent, or Firm*—Workman Nydegger

(57) ABSTRACT

Systems, methods, and computer program products for managing and prioritizing record events. A priority manager includes an event list that lists scheduled record events. Each event in the event list has a priority that is different from the other events in the event list. If some of the events conflict, then those events with the highest priority in the event list are recorded. A user can assign priority to events when they are scheduled or at a later time. This enables event conflicts to be resolved by the user when the events are initially scheduled. When an event conflict arises later, the conflict is resolved by the priority manager according to the relative priority of the events in the event list.

35 Claims, 4 Drawing Sheets

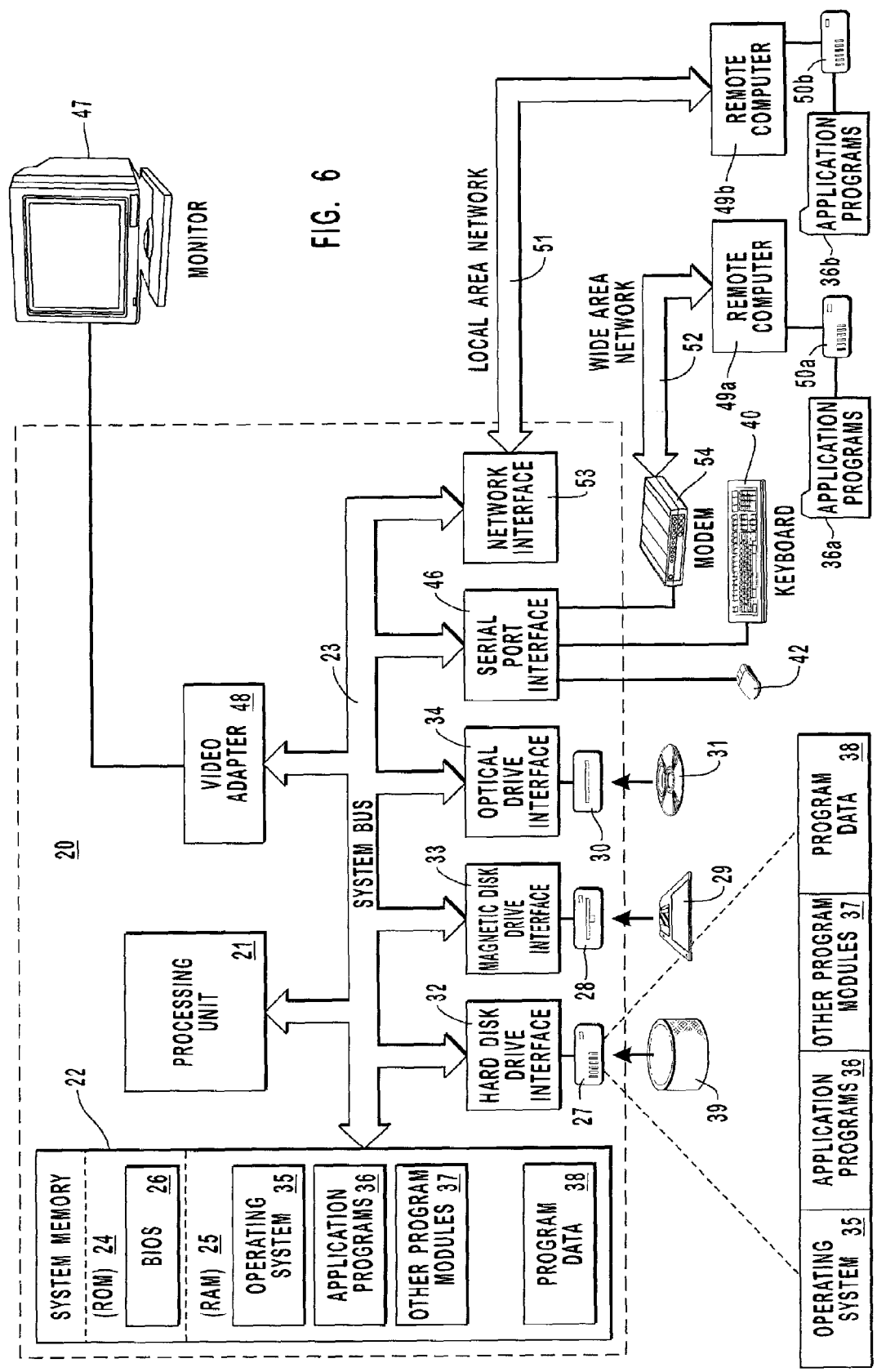

MANAGING RECORD EVENTS

BACKGROUND OF THE INVENTION

1. The Field of the Invention

The present invention relates to managing and scheduling events. More particularly, the present invention relates to systems, methods, and computer program products for managing record events using a priority manager to resolve conflicts that occur between some of the recording events.

2. Background and Relevant Art

Today, many devices have the ability to digitally record a video stream such as a television program. The recorded video streams are often stored on a hard drive where they may be viewed at the leisure of a user. In fact, some homes have more than one device that is able to record video streams. In addition to viewing and recording video streams, these devices often provide other functionality to users, such as browsing the Internet.

Even though a network may have more than one device that can view and record video streams, the number of video streams that can be concurrently recorded is often limited by the number of tuners that are present in the recording devices. Tuners are effectively a limited resource and users encounter situations where they want to concurrently record more video streams than they have tuners. Because of these conflicts, there is a need to determine which video streams or programs should be recorded.

There are many situations that can create an event conflict such as a recording conflict. For example, a recording conflict can occur when one of the programs to be recorded is rescheduled to broadcast at a different time that coincides with an already scheduled event. The rescheduled program is often reflected, for instance, in the guide data that is supplied to the recording device. Recording conflicts can also occur when a program runs longer than its scheduled time. In other words, a particular program may not end at its scheduled time, it may be interrupted by a breaking news story, and the like. Sporting events are a typical example of a program that may not end at a scheduled time. The ability to record beyond the scheduled ending time may conflict with another event that is already scheduled. Another situation where a recording conflict occurs is when a user schedules too many programs to record concurrently.

The complexity of managing these conflicts increases because of the flexibility the user has in scheduling recording events. A user, for example, can schedule an entire season of a particular program to be recorded. However, future guide data is limited in scope and potential conflicts cannot be determined when the record event is scheduled. Some of the future programs, for example, may not air on the same day or the week or they may be special episodes that last longer than normal episodes.

In another example, the user may schedule record events that are dependent on characteristics of the programs. For example, the user may want to record all programs that have a particular actor, which is determined by searching the guide data. These types of events cause conflicts that become known at a later time after these programs have been identified and scheduled. For at least these reasons, recording conflicts are practically inevitable.

SUMMARY OF THE INVENTION

The present invention recognizes the limitations of the prior art and the need for systems, methods, and computer program products that are able to manage and schedule events including record events. In accordance with the present invention, a priority manager enables a user to resolve conflicts when the event is initially scheduled. The priority manager also resolves conflicts in the absence of user input according to the priority of the events that are currently scheduled.

When a user schedules an event, the priority manager permits the user to establish the priority of the event or program. By default, an event receives the lowest priority in the priority manager if the priority is not set or assigned by the user. The priority manager is able to prioritize all types of record events, including but not limited to, single record events, series record events, smart record events, and manual record events.

Scheduled record events with higher priorities record before events of lower priority. Thus, if too many events or programs are scheduled to record concurrently, then those events or programs with the highest priority will be recorded and those with lower priorities will not be recorded. In this manner, the priority manager is able to resolve scheduling or recording conflicts that are not resolved by the user.

The user also has the ability to change the priority of any event. By changing the priority of an event, the user can thus resolve some of the recording conflicts before they occur and the priority manager ensures that high priority events are performed. In one example, a user may assign a low priority to an event that conflicts with another event. The new event will only record, for example, if higher priority events are canceled, rescheduled, or the like.

In some instances, there may be insufficient storage space on the recording device to successfully record all of the scheduled events. Another aspect of the present invention relates to deleting events or programs in order to provide sufficient storage space. This can be accomplished using the priority manager to pre-age recorded programs or scheduled events and recommend programs and/or events for deletion instead of simply deleting the oldest recording(s). The necessary storage space can also be provided by deleting recoverable resources through reprioritization. For example, the guide data can be searched to determine if a program currently recorded is broadcast in the future. If the program is broadcast in the future, then that program can be deleted and re-recorded on the future broadcast date.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings, Understanding that these drawings depict only typical embodiments of the invention and are not therefore to be considered to be limiting of its scope, the invention will be described and explained with additional specificity and detail through the use of the accompanying drawings in which:

FIG. 6 illustrates an exemplary system that provides a suitable operating environment for the present invention.

DETAILED DESCRIPTION OF THE PREFERRED EMBODIMENTS

The number of events that can be concurrently performed by a system such as a set top box or a network is often limited by the resources of the set top box or the network. With respect to record events, the number of video streams that are scheduled to be concurrently recorded by a set top box or by a network that has access to tuning resources is limited by the number of tuners that are available in the tuning resources of the set top box or network. Because of this limitation, it is possible that the tuning resources of the set top box/network will not be able to successfully record all of the video streams that are scheduled for recording.

The present invention relates to systems, methods, and computer program products for record events using a priority manager. The priority manager provides flexibility to the user and is not limited to making recording decisions based on when the record event is scheduled, which is often the case with first in first out (FIFO) and last in first out (LIFO) recording mechanisms.

The present invention provides a priority manager that manages all types of record events by assigning a priority to each record event. None of the scheduled record events will have the same priority and the priority manager is accessible to the user from various applications. The priority manager, for example, is available when the user schedules an event such that a potential conflict can be resolved when the event is scheduled by allowing the user to assign a preferred priority to some or all of the scheduled events. When the user is unable to resolve the conflict, then the scheduled events are recorded according to their assigned priority.

Figure 1:
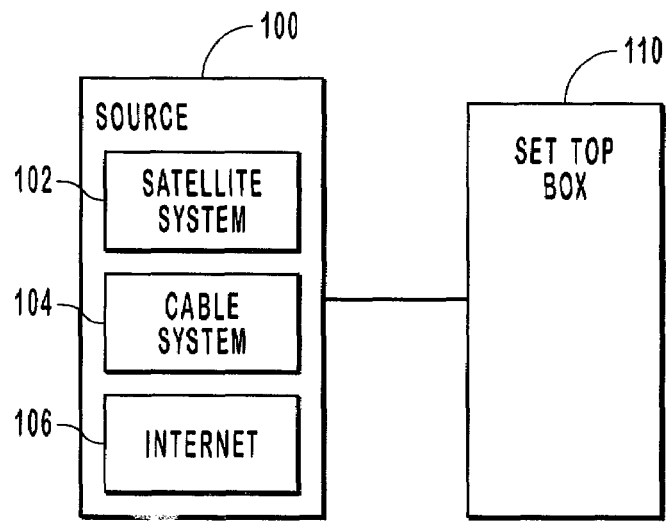
FIG. 1 illustrates exemplary sources that deliver content to a set top box and further illustrates an exemplary environment for implementing the present invention.

FIG. 1 illustrates an exemplary environment for implementing the present invention. FIG. 1 illustrates a source 100 that is connected with a set top box 110. Exemplary sources include, but are not limited to, a satellite system 102, a cable system 104 and the Internet 106. The content or data that is available from the source 100 includes, but is not limited to, audio/video data, video streams, text, guide data, services, software updates, advertisements, image data, other data and the like or any combination thereof.

The set top box 110 is an exemplary computing environment that is able to receive, send and process content. Exemplary set top boxes include, but are not limited to, digital video recorders (DVRs), satellite receivers, Internet terminals, cable boxes, digital satellite systems (DSS), and the like or any combination thereof. The set top box 110, for example, may also function as a server computer for a home network. In this situation, the set top box would distribute content from the source 100 to other set top boxes.

Figure 2:
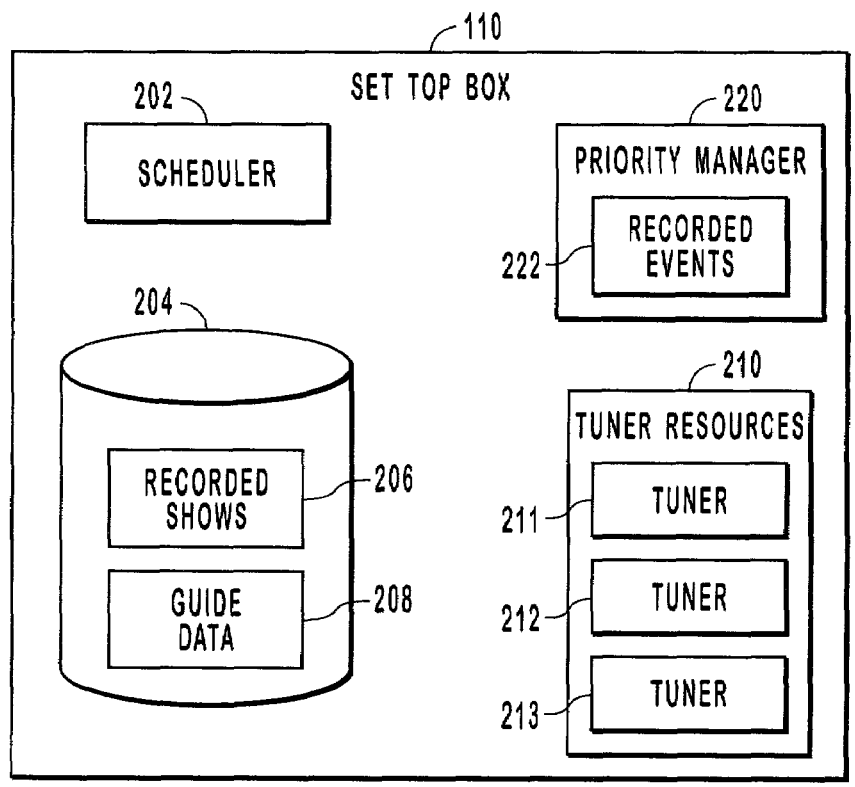
FIG. 2 illustrates a set top box including a priority manager for managing record events that are recorded using tuner resources.

FIG. 2 illustrates an exemplary set top box where the present invention may be implemented. The set top box 110 includes a storage 204, such as a hard drive or other storage device. The set top box stores recorded programs 206, guide data 208, and other applications and data on the storage 204. The guide data 208 describes some of the content that is available from the source 100 illustrated in FIG. 1. The guide data 208 includes, but is not limited to, program start times, program end times, program titles, program duration, ratings, actors/actresses, and the like and any combination thereof.

The set top box 110 also has tuner resources 210. The tuner resources 210 include tuners 211, 212, and 213. The tuner resources 210 are used to retrieve or receive content from the sources 100. When a live television program is being watched by a user, for example, a tuner is required to view the program. A tuner is also required to record a program. In this specific example, the set top box 110 is able to concurrently record three programs or video streams because the tuner resources 210 include three tuners. It is understood by one of skill in the art that the set top box 110 may include any number of tuners and that the number of concurrent recordings is limited to the number of tuners.

The set top box 110 also includes a priority manager 220 that manages record events 222. While the present invention is discussed in terms of record events, it is understood that the principles taught herein can be applied to other types of events such as delete events or reminder events. The record events 222 are created by the scheduler 202 and are ordered according to their priority. By default, newly scheduled events have the lowest priority unless altered by the user or the set top box 110.

The ability to change the priority of a particular event can occur either explicitly or implicitly. For example, the record events 222 can be displayed to a user and the user can manipulate the priorities of the record events. Alternatively, the priority of a particular event is altered by having the user choose which program to record when a conflict occurs, For example, when a user decides to record a program and the priority manager determines that there is a conflict, which indicates that a tuner will not be available for the entire duration of the program that is being scheduled to record, then the user is presented with the option of recording the previously scheduled program or recording the current program.

If the user selects to record the previously scheduled program, then the current program has the option of being recorded until the previously scheduled program begins. Also, the current program is given a lower priority in the priority manager than the conflicting record event. If the user elects to record the current program, then the previously scheduled program is not recorded and the current program is given the highest priority in the priority manager than the conflicting record event. Alternatively, the current program is given sufficient priority to ensure that it is recorded ahead of the previously scheduled conflicting event. Often, the new event being scheduled is given a priority greater than the lowest priority event with which the event being scheduled conflicts.

Figure 3:
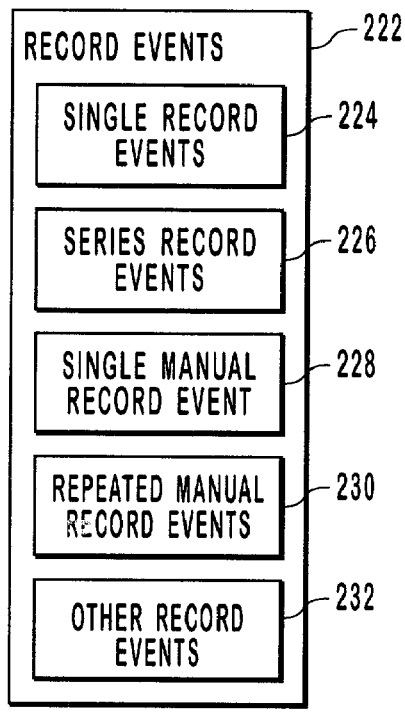
FIG. 3 illustrates exemplary types of record events.

FIG. 3 identifies exemplary record events 222. A single record event 224 occurs, for example, when a user identifies a program from the guide data that is provided to the set top box and stored on the set top box. After the program is identified by the user, the user can choose to record the event. The start time, end time, and other program attributes are typically determined from the guide data and the user is not required to provide this data to the set top box or the scheduler. When a single record event 224 is finished recording, it is removed from the record events 222.

A series record event 226 can also be identified from the guide data. The user typically identifies the program as a series and that the user desires to record all programs of the series. For example, series television programs are typically shown on a weekly basis. Scheduling a series record event 226 for a particular program causes the set top box to record each episode of the selected program. The method by which the set top box identifies the program as a series is known in the art. The series record event 226 typically remains in the record events 222 even after a particular episode of a program finishes recording because future episodes have not been recorded yet.

A single manual record event 228, on the other hand, typically identifies a time block during which a particular channel is recorded by the set top box. Certain attributes of the program being recorded, such as those described herein, are not typically known. A repeated manual record event 230 is similar to a single manual record event 228, with the difference that the repeated manual record event 230 occurs more than once. For example, a user can create a single manual record event 228 by causing the set top box to record a particular channel from 6:00 p.m. to 8:00 p.m. on a particular Tuesday. The user can create a repeated manual record event 230 by causing the set top box to record a particular channel from 6:00 p.m. to 8:00 p.m. on every Tuesday. A single manual record event 228 is removed from the record events 222 after the recording terminates, while a repeated manual record event is not necessarily removed from the record events 222.

FIG. 3 further illustrates other record events 232, which refers to other types of record events. One example of another record event is a smart record event. In a smart record event, the user indicates that he or she desires to record all programs that have a particular attribute or characteristic. The set top box or the scheduler is able to search the guide data for these attributes or characteristics. When a program is found that matches the attributes or characteristics, the program is scheduled as a record event by the scheduler in the priority manager.

For example, a user may desire to record all sporting events that include a particular team. The scheduler can search the guide data to find these events and schedule those that are found in the guide data. As new guide data is received by the set top box, the guide data is searched to determine if any future programs should be scheduled for recording according to the smart record event.

Because this type of event is typically scheduled without input from the user when it is scheduled, it is given a default priority in the record events of the priority manager. If there is a conflict, the conflict can be brought to the attention of the user, for example, by displaying a conflict notice. If the conflict is not resolved, the events with higher priority are given preference and are recorded before lower priority events are recorded.

Figure 4:
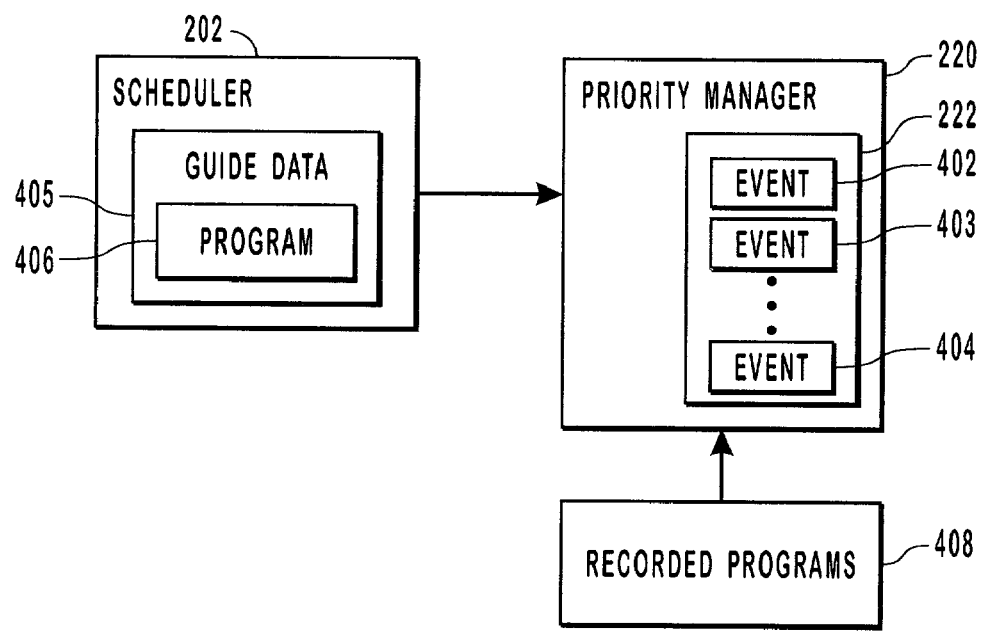
FIG. 4 illustrates a priority manager that has a list of prioritized record events and also illustrates that different applications have access to the priority manager.

FIG. 4 is a block diagram illustrating a priority manager. The priority manager 220 of FIG. 4 illustrates record events 222. The record events 222 include all events that have been scheduled for recording in this example. As previously noted, other events may be managed and scheduled by the priority manager 220. This example includes event 402, 403 and 404. The first event in the record events 222 is the event 402 and the last event is the event 404. The order of the events in the record events 222 also illustrates the priority of the event. Thus, the event 402, because it is the first listed event, has the highest priority. The event 404, because it is listed last, has the lowest priority of all events in the record events 222. None of the events in the record events 222 have the same priority.

FIG. 4 further illustrates how the priority manager may be used to prioritize scheduled events. When a user is scheduling a record event, a program 406 may be selected or identified from the guide data 405. After the program is selected and if there is no conflict, the selected program is scheduled as the lowest priority recording event in the record events 222. The priority manger, however, can assign a priority to any event including new events and the present invention is not limited to assigning a lowest priority to newly scheduled record events. In some instances, the priority assigned to a particular event is received from the user. When a conflict is present, the new event may be given the highest priority.

Alternatively, the user is able to give the newly scheduled event an assigned priority. The user has the option of inserting the newly scheduled event at any point of the record events 220. In other words, the priority manager is typically displayed to the user and the user is able to view all of the scheduled events in the record events 222. The new event will be placed in the record events 222 by the priority manager 220 according to how the user resolves the conflict. If, for example, the user decides to permit previously scheduled event to take priority over the newly scheduled event, then the new event is placed at the bottom of the record events 222 and has the lowest priority. In this manner, a priority is assigned to each scheduled event managed by the priority manager.

If the user decides to permit the new event to have priority over older events, the new event is inserted in the list of events one place higher than the highest priority event that conflicts with the new event. Thus, if the new event conflicts with the event 403, then the new event would be inserted above the event 403 and below the event 402. Alternatively, the new event can be inserted above the event 402 such that the new event has the highest priority. The user can also manually insert the event anywhere in the record events 222 of the priority manager 220.

In another example, the user may simply be informed that the event being scheduled conflicts with an existing event. The user is then given the option of either recording the existing event or of recording the new event. If the user determines that he or she would rather record the new event, then the new event is given a priority in the record events 222 that is higher than the existing event or the new event is given the highest priority. If the new event conflicts with multiple events, then the new event is given: a priority that is at least higher than the lowest priority event of the conflicting events, a priority that is higher than the highest priority event of the conflicting events, or the highest priority. If the user elects to record the previously scheduled event, then the new event is still scheduled by the priority manager 220, but it is given a lower priority than the conflicting events or the new event is given the lowest priority. This enables the set top box to record the event in the case where a higher priority event is deleted or rescheduled, for example.

The priority manager can have a default prioritization mechanism where new events are either assigned the highest priority or are assigned a priority that is higher than the highest priority event of conflicting events. Conversely, when the new event is to be given a low priority, the priority manager can assign the lowest priority to the new event or can assign a priority that is lower than the lowest priority of the conflicting events. In other words, various schemes can be used to determine the priority of a new event. By giving the new event the highest priority, the user is assured that this event will record. By giving the new event a priority that is higher than the lowest priority of the conflicting events, it is possible that the event will not be recorded, especially if the number of conflicting events is greater than the number of tuners in the system. Thus, new events are preferably given the highest priority.

FIG. 4 also illustrates that the priority manager 220 is accessible from multiple applications. As described above, the priority manager 220 is available from the scheduler 202 or when a user is scheduling an event and resolving conflicts that arise with respect to the newly scheduled event. The priority manager 220 is also accessible from the recorded programs 408.

For example, a series record event is set to record a program on a weekly basis. One week, the recording does not occur. The user is able to view a history log in the recorded programs 408 and discover that other programs with higher priority were scheduled to record. As a result, the series record event did not record. The user can access the priority manager 220 and set the priority of the series record event higher.

If the user does not resolve a conflict when an event is scheduled, then the priority manager resolves conflicts between events in the event list. In one example, the programs are recorded according to their priority in the record events 222 of the priority manager 220. If the set top box has three tuners and four programs are scheduled to concurrently record, then the program with the lowest priority will not be recorded. As previously mentioned, the user can assign a new priority to the unrecorded program, assuming that the program can be recorded in the future. A single record event, for example, is deleted from the record events 222 after it finishes recording or after its scheduled broadcast time lapses.

When the user adjusts the priorities of recording events, the events are often displayed to reflect their type. In other words, a user is able to visually determine whether an event is a series record event, a manual record event, etc. This information can be used as needed by the user in determining a priority for a particular event. Whenever there is a change in the priority of the events managed by the priority manager, the scheduler dynamically updates the event list of programs that are to be recorded. The programs that will not be recorded can also be displayed to the user from various applications.

Figure 5:
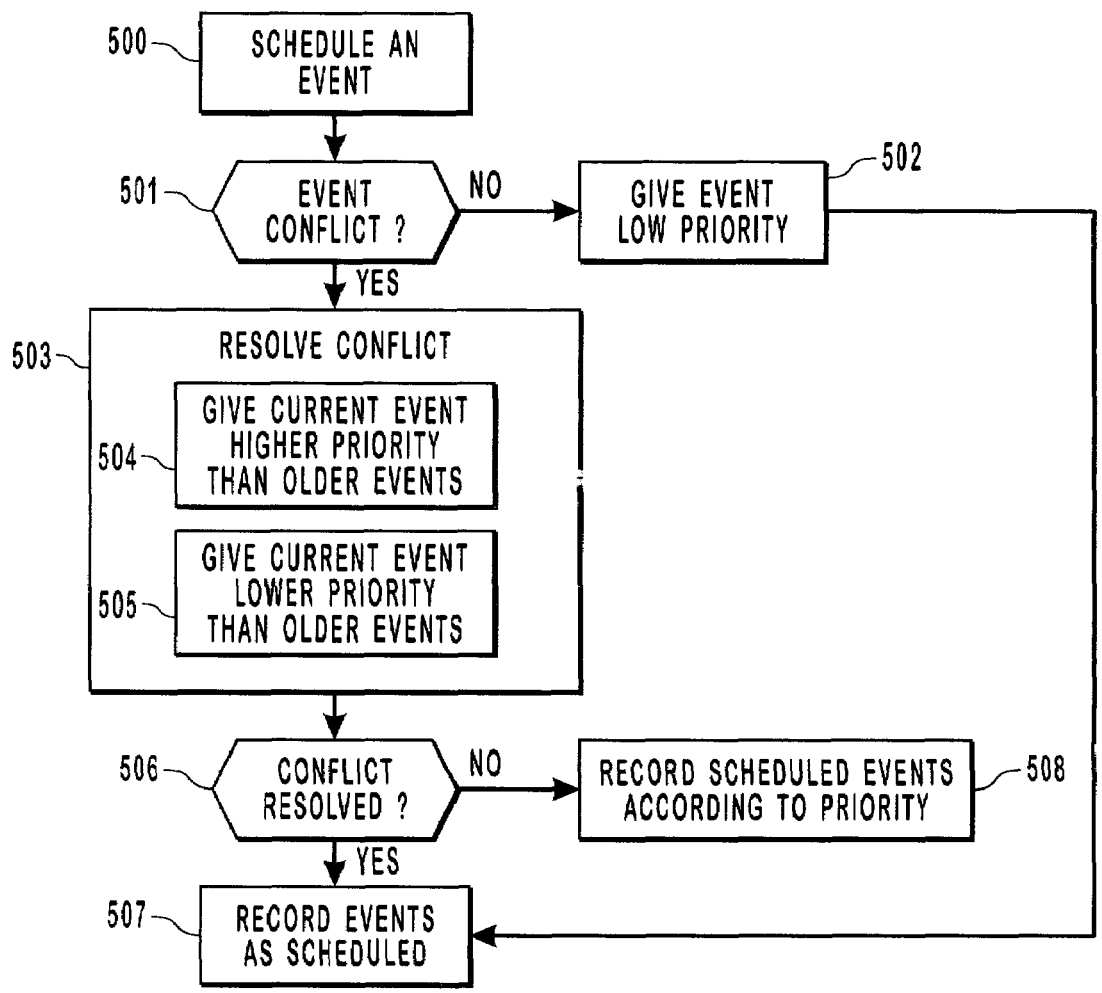
FIG. 5 is a flow diagram illustrating an exemplary method for managing record events that conflict with other record events.

FIG. 5 illustrates an exemplary flow diagram for using a priority manager to record events. The priority manager uses user input to schedule an event (500). The event may be received, as previously stated, from the guide data or any other source. The event may be a record event or other type of event. While the priority manager is scheduling the event for the user, the scheduler (which may be a module of the priority manager in one embodiment) determines whether there is a conflict (501) with another event. If there is no conflict, the new event is given a low priority (502) and the event is recorded as scheduled (507). Note that new event receives a low priority by default, but another priority may be assigned to the new event. The user and/or the priority manager, for example, may assign the new event the highest priority.

If a conflict exists between the new event and an existing event, then the user is given the opportunity to resolve the conflict (503). This can occur generally by allowing the user to give the new event a higher priority than older events (504). As previously described, the new event is assigned or given a priority that is higher than the lowest priority of the event that is in conflict with the new event. Alternatively, the new event is assigned a priority that is lower than the existing events (505) that conflict with the new event. In one example, the new event is given the lowest priority. In both cases, the priority can be assigned or set by the user and the new event can be inserted at any point of the record events in the record event list.

If the conflict is resolved (506), then the scheduled events are recorded as scheduled (507). If the conflict is not resolved, then the priority manager records or performs the events according to their priority in the event list of the priority manager (508). There are many situations that may cause the conflict to not be resolved. For example, the event may be given lower priority than conflicting events. In this case, the event will only record when higher priority events are deleted, rescheduled, etc. Alternatively, a conflict may not arise when the event is initially scheduled, but may arise later when the user is unable to resolve the conflict. A scheduled event may not end in a timely fashion and extend into another event, for example.

A conflict can also occur when the number of tuners changes or when a tuning resource is lost. For example, a tuner may stop working or may be removed from the system in real-time. Alternatively, a record event with higher priority may begin and take a tuner from a lower priority event. The lower priority event thus loses the tuner or the tuning resource. The priority manager can then determine which events to keep recording or performing and which events are terminated based on the relative priorities of the events in the priority manager. Other real-time problems may arise that result in a lost tuner(s) or in an event conflict. In these and other situations, the events are recorded by the priority manager according to their priority in the event list as previously described.

The present invention also addresses the issue of ensuring that there is sufficient storage space to accommodate scheduled events. Often, it is necessary to delete some of the recorded events or programs from the storage of the recording device in these situations. A conflict can also arise when the recording device does not have sufficient storage space to accommodate future record events. For example, assume that a recording device is only able to store three (3) hours of video content. Further assume that there are four record events scheduled to record. The first three scheduled record events are recorded without difficulty. However, there is insufficient storage to successfully record the fourth record event.

This present invention addresses this issue by analyzing the recorded content and the guide data, which identifies future programs, such that recorded programs that are also broadcast in the future may be deleted and, at a later time, re-recorded. In this example, the first and third record events were one time events and will not be repeated in the future. A search of the guide data reveals that the second program will be broadcast again in seven days. Thus, the second program is deleted from the storage to make room for the fourth program. The deleted program is then re-recorded when it is broadcast in the future. If no storage space is available at that time, the above process may be repeated. If this process does not free storage space, then a default delete process is invoked. In one example, the oldest recorded program is deleted to free storage for the new record event.

Thus, the system first determines that there is not sufficient storage space to record a program. Next, it is necessary to estimate how much storage will be required for the program being recorded. This is done by examining the guide data to determine the program duration, at which point an estimation of the storage space can be made. The system then determines which programs or shows can be deleted. Each program typically has a title and an identifier. The identifier is often unique and helps the system distinguish, for example, between episodes of a television series. Using this information from the shows that are stored on the recording device, the guide data is searched to determine which of the recorded shows will be broadcast in the future.

After the system identifies which recorded programs will be broadcast in the future, enough programs are deleted to free sufficient storage space to record the record event. An event is typically scheduled for the deleted programs to ensure that they are re-recorded in the future. If insufficient storage space exists at that time, the process is repeated to ensure that all programs are successfully recorded on the recording device. To prevent a program from being re-recorded repeatedly, the program may simply be deleted after it has been watched, after a certain time period lapses, or after the same program has been recorded a certain number of times.

Another mechanism for freeing storage space is to use the priority manager. In this example, the priority manager can be used to prioritize recorded programs for potential deletion. Thus, a recorded program with the lowest priority will be deleted before a program of higher priority. When the events in the priority manager are recurring or series events, programs that were recorded because of a particular series event can be deleted based on the priority of the series event in the priority manager. The order in which programs are deleted can vary. For example, all programs from the series event with the lowest priority may be deleted before any programs from the next lowest series event are deleted. Alternatively, the system may require that a program be deleted from each series event before a second program from a particular series event is deleted. Other deletion schemes for deleting program based on the priority manager are contemplated by the present invention.

The prioritization of recorded programs or shows for deletion can also take other factors into account. These factors or criteria include, but are not limited to, watched/unwatched, recording date, and the priority. Some recorded programs are protected, for example, by a "keep until" date function. Shows can be primarily prioritized for deletion based on their priority and secondarily prioritized on whether the program has been watched or by the age of the recording based on the record date. A combination of these factors can be implemented in a deletion scheme.

A program with a low priority will be deleted before a program with a high priority. For example, a program from a series event that has been watched may be deleted before a program from the same series event that has not been watched. In another example, when two programs from the same series event have both been watched by the user, the older program may be deleted before the more recent program is deleted.

In another embodiment, a priority manager can be established for recorded programs. In this instance, the priority manager will contain a list of recorded programs that are subject to deletion. Each program may be associated with a date such as a keep until date. The user may determine or set the keep until date for each program in the priority manager for recorded programs. Some programs may have a keep until date of "forever," indicating that these shows are not to be deleted. Other programs may simply have dates. When storage space is required, the keep until dates can be examined and the program that will expire first is pre-aged and deleted. If more storage space is required, another program can be aged and deleted in this manner. A user can use the priority manager for recorded shows to change these priorities as well. In other words, a priority manager for recorded programs determines which programs should be deleted according to their relative priorities just as a priority manager for record events detenriines which events are recorded according to their relative priorities.

The present invention extends to both methods and systems for managing record events. The embodiments of the present invention may comprise a special purpose or general-purpose computer including various computer hardware, as discussed in greater detail below. The set top box discussed herein in an example of a special purpose computer although the set top box discussed herein may also be a general purpose computer.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 6. The logical connections depicted in FIG. 6 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system that includes tuner resources, wherein tuner resources are required to perform record events in the system and wherein one or more record events are scheduled to record, a method for managing the record events such that the events are recorded according to their priority, the method comprising:
   maintaining a record event list with a priority manager, wherein the record event list includes one or more record events that each have a different priority;
   scheduling a new event that creates a conflict with at least one other event that is already included in the record event list;
   assigning a priority to the new event such that the conflict is resolved as the new event is scheduled, wherein the priority is received from a user;
   performing the record events in the record event list that have the highest priority when a conflict arises between events that the user is unable to resolve; and
   determining which events to continue recording when a tuning resource is lost, based on priorities of the record events in the record event list.

2. A method as defined in claim 1, wherein maintaining a record event list with a priority manager further comprises providing the record event list to the scheduler and to the user.

3. A method as defined in claim 1, wherein scheduling a new event comprises one or more of:
   scheduling a single record event;
   scheduling a series record event;
   scheduling a single manual record event;
   scheduling a repeated manual record event; and
   scheduling a smart record event.

4. A method as defined in claim 1, assigning a priority to the new event such that the conflict is resolved as the new event is scheduled, wherein the priority is received from a user further comprises assigning the new event a higher priority than the conflicting events in the record event list.

5. A method as defined in claim 1, wherein assigning a priority to the new event such that the conflict is resolved as the new event is scheduled, wherein the priority is received from a user further comprises assigning the new event a lower priority that the conflicting events in the record event list.

6. A method as defined in claim 1, wherein assigning a priority to the new event such that the conflict is resolved as the new event is scheduled, wherein the priority is received from a user further comprises assigning the new event a priority that is higher than the conflicting event with the lowest priority.

7. A method as defined in claim 1, further comprising recording events with the highest priorities even when a conflict with another event is unresolved, wherein the conflicting events that have the lowest priority are not recorded.

8. A method as defined in claim 1, further comprising assigning a default priority to the new event when the new event does not conflict with an event that is already scheduled.

9. A method as defined in claim 1, further comprising:
   determining that there is insufficient storage to perform the events in the record event list;
   deleting at least one program from the storage such that there is sufficient storage to perform a pending event in the record event list, wherein each program deleted from the storage is broadcast at a later time; and
   re-recording each deleted program at the later time.

10. A method as defined in claim 9, wherein deleting at least one program from the storage such that there is sufficient storage to perform a pending event in the record event list further comprises:
    identifying each program stored in the storage; and
    searching guide data to determine a program stored in the storage that is broadcast in the future.

11. A method as defined in claim 9, wherein deleting at least one program from the storage such that there is sufficient storage to perform the events in the record event list further comprises at least one of:
    using the priority manager to identify programs for deletion based on a priority of the recorded programs; and
    using criteria to determine which programs are deleted, wherein the criteria includes whether a recorded program is watched or unwatched, when a program was recorded, and a priority of the recorded program.

12. A method as defined in claim 9, wherein deleting at least one program from the storage such that there is sufficient storage to perform a pending event in the record event list, wherein each program deleted from the storage is broadcast at a later time further comprises deleting at least one program using a priority manager for recorded programs, wherein the priority manager for recorded shows prioritizes the recorded programs such that recorded programs with the lowest priority are deleted in order to perform the events in the record list.

13. In a system that records video streams received from a source, a method for prioritizing record events to determine which video streams are recorded when the system does not have sufficient tuning resources to record all of the record events, the method comprising:
    scheduling one or more record events in an event list, wherein each of the record events in the event list has a priority that is different from other events in the event list;
    establishing a priority for each new record event in the event list, wherein new events that conflict with existing events are given a priority by a priority manager that is different from the priorities of the other events in the event list; and
    when more record events are currently scheduled than there are tuning resources, recording the record events in the event list that have the highest priority, wherein recording the record events in the event list that have the highest priority further also includes determining which events to keep recording when a tuning resource is lost based on priorities of the record events in the event list.

14. A method as defined in claim 13, wherein scheduling one or more record events in an event list further comprises scheduling new events such that a new event has the lowest priority in the event list.

15. A method as defined in claim 13, wherein scheduling one or more record events in an event list further comprises:
    scheduling a single record event;
    scheduling a series record event;
    scheduling a single manual record event;
    scheduling a repeated manual record event; and
    scheduling a smart record event.

16. A method as defined in claim 13, wherein establishing a priority for each new record event in the event list further comprises one of:
    assigning a new event a priority that is higher than the lowest priority of those events in the event list that conflict with the new event; and
    assigning the new event a priority that is lower than those events in the event list that conflict with the new event.

17. A method as defined in claim 13, wherein establishing a priority for each new record event in the event list further comprises receiving an assignment of priority for at least one of the events in the event list from a user.

18. A method as defined in claim 13, further comprising altering the priorities of the record events in the event list from another application.

19. A method as defined in claim 13, further comprising one of:
    assigning a particular event a highest priority; and
    assigning a particular event a lowest priority.

20. In a system that includes tuner resources, wherein tuner resources are required to perform record events in the system and wherein one or more record events are scheduled to record, a computer program product for implementing a method for managing the record events such that the events are recorded according to their priority, the computer program product comprising:
    a computer readable storage medium storing computer executable instructions that when executed by a computer, perform a method, the method comprising:
        maintaining a record event list with a priority manager, wherein the record event list includes one or more record events that each have a different priority;
        scheduling a new event that creates a conflict with at least one other event that is already included in the record event list;
        assigning a priority to the new event such that the conflict is resolved as the new event is scheduled, wherein the priority is received from a user;
        performing the record events in the record event list that have the highest priority when a conflict arises between events that the user is unable to resolve; and
        determining which events to continue recording when a tuning resource is lost, based on priorities of the record events in the record event list.

21. A computer program product as defined in claim 20, wherein maintaining a record event list with a priority manager further comprises providing the record event list to the scheduler and to the user.

22. A computer program product as defined in claim 20, wherein scheduling a new event comprises one or more of:
    scheduling a single record event;
    scheduling a series record event;

scheduling a single manual record event;
scheduling a repeated manual record event; and
scheduling a smart record event.

23. A computer program product as defined in claim 20, assigning a priority to the new event such that the conflict is resolved as the new event is scheduled, wherein the priority is received from a user further comprises assigning the new event a higher priority than the conflicting events in the record event list.

24. A computer program product as defined in claim 20, wherein assigning a priority to the new event such that the conflict is resolved as the new event is scheduled, wherein the priority is received from a user further comprises assigning the new event a lower priority that the conflicting events in the record event list.

25. A computer program product as defined in claim 20, wherein assigning a priority to the new event such that the conflict is resolved as the new event is scheduled, wherein the priority is received from a user further comprises assigning the new event a priority that is higher than the conflicting event with the lowest priority.

26. A computer program product as defined in claim 20, further comprising recording events with the highest priorities even when a conflict with another event is unresolved, wherein the conflicting events that have the lowest priority are not recorded.

27. A computer program product as defined in claim 20, further comprising assigning a default priority to the new event when the new event does not conflict with an event that is already scheduled.

28. In a system that records video streams received from a source, a computer program product for implementing a method for prioritizing record events to determine which video streams are recorded when the system does not have sufficient tuning resources to record all of the record events, the computer program product comprising:
  a computer readable storage medium storing computer executable instructions that when executed by a computer perform a method, the method comprising:
    scheduling one or more record events in an event list, wherein each of the record events in the event list has a priority that is different from other events in the event list;
    establishing a priority for each new record event in the event list, wherein new events that conflict with existing events are given a priority by a priority manager that is different from the priorities of the other events in the event list; and
    when more record events are currently scheduled than there are tuning resources, recording the record events in the event list that have the highest priority, wherein recording the record events in the event list that have the highest priority further also includes determining which events to keep recording when a tuning resource is lost based on priorities of the record events in the event list.

29. A computer program product as defined in claim 28, wherein scheduling one or more record events in an event list further comprises scheduling new events such that a new event has the lowest priority in the event list.

30. A computer program product as defined in claim 28, wherein scheduling one or more record events in an event list further comprises:
    scheduling a single record event;
    scheduling a series record event;
    scheduling a single manual record event;
    scheduling a repeated manual record event; and
    scheduling a smart record event.

31. A computer program product as defined in claim 28, wherein establishing a priority for each new record event in the event list further comprises one of:
    assigning a new event a priority that is higher than the lowest priority of those events in the event list that conflict with the new event; and
    assigning the new event a priority that is lower than those events in the event list that conflict with the new event.

32. A computer program product as defined in claim 28, wherein establishing a priority for each new record event in the event list further comprises receiving an assignment of priority for at least one of the events in the event list from a user.

33. A computer program product as defined in claim 28, further comprising altering the priorities of the record events in the event list from another application.

34. A computer program product as defined in claim 28, further comprising one of:
    assigning a particular event a highest priority; and
    assigning a particular event a lowest priority.

35. A computer program product as defined in claim 28, wherein recording the record events in the event list that have the highest priority further comprises determining which events to keep recording when a tuning resource is lost based on priorities of the record events in the event list.

* * * * *

UNITED STATES PATENT AND TRADEMARK OFFICE
CERTIFICATE OF CORRECTION

PATENT NO.        : 7,369,750 B2
APPLICATION NO.   : 10/131661
DATED             : May 6, 2008
INVENTOR(S)       : David J. Cheng et al.

It is certified that error appears in the above-identified patent and that said Letters Patent is hereby corrected as shown below:

In column 3, line 66, after "box" insert -- 110 --.

In column 10, line 7, delete "detenriines" and insert -- determines --, therefor.

In column 10, line 60, after "microprocessor-based" insert -- or programmable consumer electronics, network PCs, minicomputers, mainframe --.

Signed and Sealed this
Nineteenth Day of April, 2011

David J. Kappos
*Director of the United States Patent and Trademark Office*